(No Model.)

M. LUDWIG.
BILLIARD TABLE.

No. 280,198. Patented June 26, 1883.

WITNESSES:
Chas. Nida
Jno. N. Bruns.

INVENTOR
Matthew Ludwig
BY
ATTORNEY

UNITED STATES PATENT OFFICE.

MATTHEW LUDWIG, OF STAMFORD, CONNECTICUT.

BILLIARD-TABLE.

SPECIFICATION forming part of Letters Patent No. 280,198, dated June 26, 1883.

Application filed April 13, 1883. (No model.)

*To all whom it may concern:*

Be it known that I, MATTHEW LUDWIG, of Stamford, Fairfield county, State of Connecticut, have invented a new and useful Improvement in Billiard-Tables; and I do hereby declare the following to be a full, clear, and exact description of the same, reference being had to the accompanying sheet of drawings, forming part of this specification.

This invention is in the nature of an improvement in billiard-tables; and the invention consists in the broad rails of a billiard-table beveled, and with mitered ends secured together by a screw-bolt at right angles to the miters, and combined with a fixed nut in one of the rails and a revolving nut fitted to the other rail, whereby the screw is turned and the rails secured together at their mitered ends.

The invention also consists in combining said mitered ends, screw-bolt, and nuts with a plate fixed to the mitered end of one rail and provided with a tenon to fit into a corresponding mortise in the mitered end of the other rail; and the invention further consists in combining the aforesaid mitered ends and their several parts with a triangular plate of metal secured to the under side of the broad rails and spanning the mitered joint thereof, whereby said mitered joint is strengthened and the legs of the table fixed in place, all of which is more particularly described hereinafter.

Figure 1:
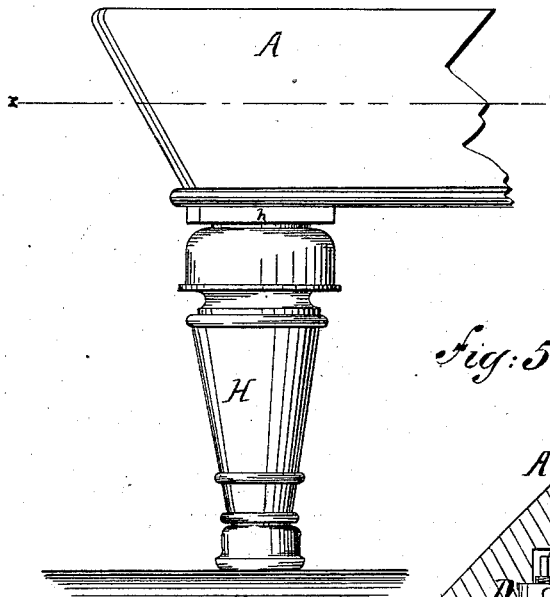
Figure 3:
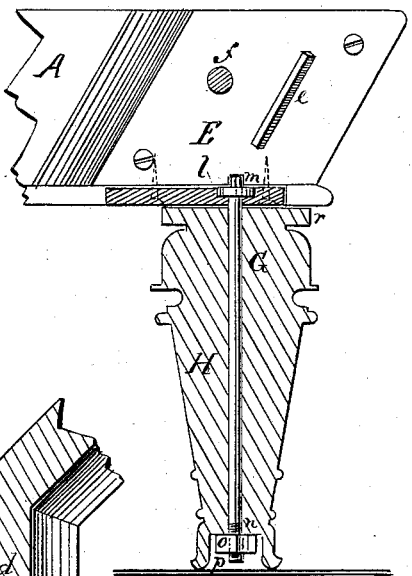
Figure 5:
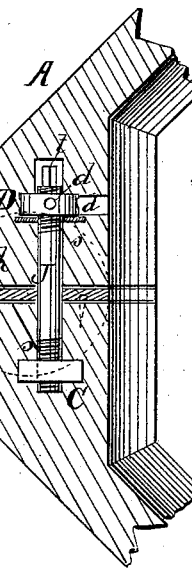
Figure 2:
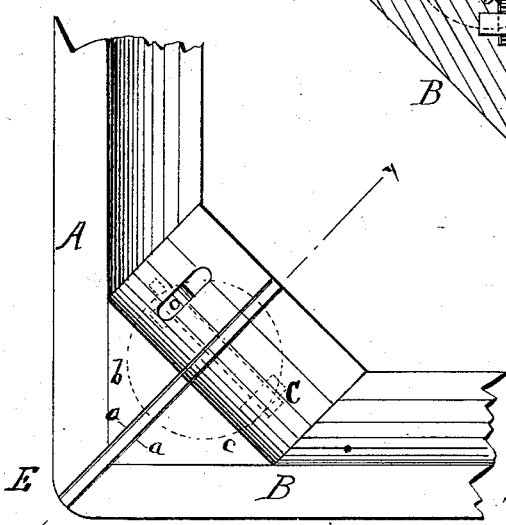
Figure 4:
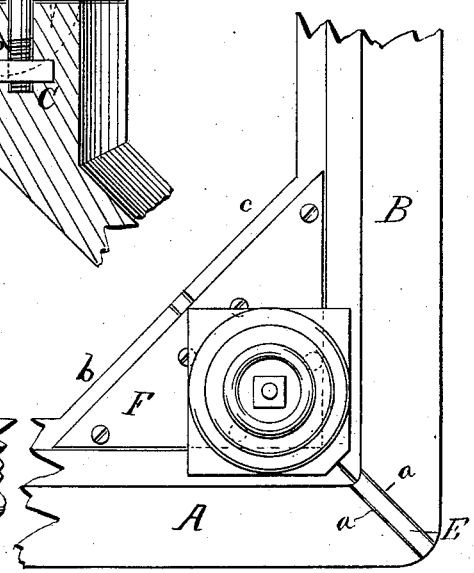

In the accompanying sheet of drawings, Figure 1 is a side elevation of my invention. Fig. 2 is a plan or top view of same. Fig. 3 is a longitudinal section taken in line *y y*, Fig. 2. Fig. 4 is a view of under side, showing rails, leg, and plates. Fig. 5 is a cross-section taken in line *x x*, Fig. 1.

Similar letters of reference indicate like parts in the several figures.

As is well known, many contrivances have been devised for the purpose of securing tightly together the ends of the broad rails of billiard-tables. These ends are usually fitted together by means of a mitered joint; and it is necessary for the purpose of transportation and otherwise that these rails shall be removably joined together, so that, when desired, the rails can be taken apart without inconvenience, and when joined they shall be as rigid at the joints as elsewhere. Screw-bolts have been employed for this purpose in several instances; but these bolts have usually been inserted in a direction parallel with one of the rails, and when these bolts are screwed up it generally resulted in causing the mitered ends to slide one upon the other, and thereby fail in making a true joint. As a remedy for this and other defects which have been found to exist in other methods of joining the ends of the broad rails of billiard-tables, I construct the broad rails A and B of the usual dimensions and of any suitable material, and form on the ends of the rails a miter, *a*, cut on an angle that will not only bring the ends of the rails together at a right angle, but also so as to cause the sides of the rails to bevel, as shown in Fig. 1. To the inner surfaces of the broad rails A and B are glued or otherwise fixed cleats *b* and *c*. These cleats are mitered and beveled uniformly with the mitering and beveling on the ends of the rails before named, of which they form part. Into the cleat *b* is inserted, in a suitable mortise formed therein for that purpose, a stationary nut, C, and into the cleat *c*, also in a similar mortise, is inserted a nut, D, constructed and arranged within the mortise to freely turn. Into a periphery of the nut D are made a series of holes, *d*. To the beveled and mitered surface of the rail A and cleat *b* is firmly screwed a metal plate, E, so as to completely cover said surface. This plate has formed upon it a tenon or fin, *e*, and through the plate E and the cleat *b* is made a cylindrical hole, *f*, which is in direct continuance of a hole with screw-threads made into the fixed nut C. Through the cleat *c* of the rail B is in like manner formed a corresponding cylindrical hole, which is in continuance of a threaded hole in the turning nut D; and into the mitered and beveled face of the end of the rail E and cleat *c* is formed a mortise, *h*, of suitable size and proportion to receive within it the tenon or fin *e*. To the under side of the rails A and B and cleats *b* and *c* is fitted a triangular plate of metal, F. This plate lies over or spans the under side of the joint made by the miters of the rails A and B and cleats *b* and *c*. Through the plate F, near the apex of its angle, is formed a hole, which hole is countersunk on the upper side of the plate to receive the head *l* of a bolt, G, when that bolt is passed through the hole $k$. This bolt G may be cut to a length little less than the length of the leg of the table, and it has formed upon one of its ends a square projection, $m$, in addition to the head, $l$, and upon its other end a series of screw-threads, $n$, which screw-threads are provided with a nut, $o$. The leg H of the table is formed of the usual size, and it is perforated in the direction of its length with a hole to receive the bolt G, with a countersink, $p$, at one end and a base, $r$, at the other end.

Now, when the broad rails and legs of a billiard-table and the several parts hereinbefore named are constructed substantially as described, the rails are joined and the legs fitted to the rails by providing a bolt, J, of suitable length, which has formed upon its ends screw-threads $s$, running in the same direction, and corresponding with the screw-threads formed in the nuts C and D, and having a square, $t$, at one end. This bolt J is inserted through the hole $f$, and firmly screwed into the stationary nut C by means of a wrench fitted onto the square $t$, leaving a portion of the bolt J projecting from the face of the plate E. This projecting part of the bolt J is now inserted in the hole $g$ in the cleat $c$ and into the threaded hole in the revolving nut D. The nut D has next inserted in its holes $d$ a suitable key, by means whereof the nut D is turned, and as this nut is in this way turned, the two mitered ends of the rails A and B are tightly drawn together, the tenon $e$ on the plate E entering into the mortise $h$ on the rail B. The surfaces of the mitered joints of the miters being now tightly held together by the screw-bolt J, they cannot, without unscrewing that bolt, be disconnected, and the rigidity of the joints is preserved by the tenon $e$ and the mortise $h$, which prevents the rails, or the bolt that unites them, from accidental turning or twisting. Now, it will be observed that the bolt J passes into the rails A and B and cleats $b$ and $c$ in a direction exactly at right angles to the surfaces of the mitered joints formed on said rails and cleats. By inserting this bolt in that direction it is obvious that, as the bolt is turned and draws the mitered surfaces together, there is no tendency on its part to cause the mitered surfaces to slide upon each other and displace the joint it unites. Its action is simply to squarely bring and hold together the two mitered surfaces truly and exactly, and with a degree of certainty that would not otherwise be the case if this uniting-bolt entered the rails or cleats at any other angle greater or less than a right angle. This particular position of the uniting-bolt J in its relation to the mitered surfaces of the broad rails is an important feature of my invention.

When the mitered rails are joined in the manner described, to further strengthen the joint and to add to its rigidity, I screw onto the under side of the broad rails A and B and cleats $b$ and $c$ the triangular plate F, which plate, as before stated, covers or spans the miter-joint at its under side. Before however, screwing this plate in its position, I pass through the hole $k$ in the plate the bolt G, its head $l$ resting within the countersink in the upper side of the plate, and its square projection $m$ is passing into a corresponding depression in the under edge of the plate E, so that when the plate F is screwed in position the bolt G is fixed thereto, and projects at right angles to said plate. Onto this bolt, so secured and projecting, is placed the leg H of the table, the bolt G passing through the hole in said leg, made for that purpose, and before referred to, and when the nut $o$ is screwed onto the threaded end $n$ of the bolt the leg is firmly held to the plate E, and therefore to the broad rails of the table. When the nut in this way confines the leg in place, the nut is received within the countersink $p$ of the leg, which conceals it from sight and prevents it from interfering with the level standing of the leg on the floor.

Having now described my invention, what I claim as new, and desire to secure by Letters Patent, is—

1. In a billiard-table, the broad rails thereof having mitered and beveled ends, the combination of a plate and tenon secured to one mitered surface, and a mortise formed in the other mitered surface, and a screw-bolt entering the rails at right angles to said mitered surface, and fixed and revolving nuts, as and for the purpose described.

2. In a billiard-table, the broad rails thereof having mitered and beveled ends, the combination of a plate with a tenon thereon, a corresponding mortise, a uniting-bolt, fixed and revolving nuts, and a triangular plate spanning the under side of the joint formed by said miters, and secured to the under side of the said broad rails, as and for the purpose described.

MATTHEW LUDWIG.

Witnesses:
LOUIS E. BATES,
GALEN A. CARTER, Jr.,
JNO. N. BRUNS.